Figure 8:
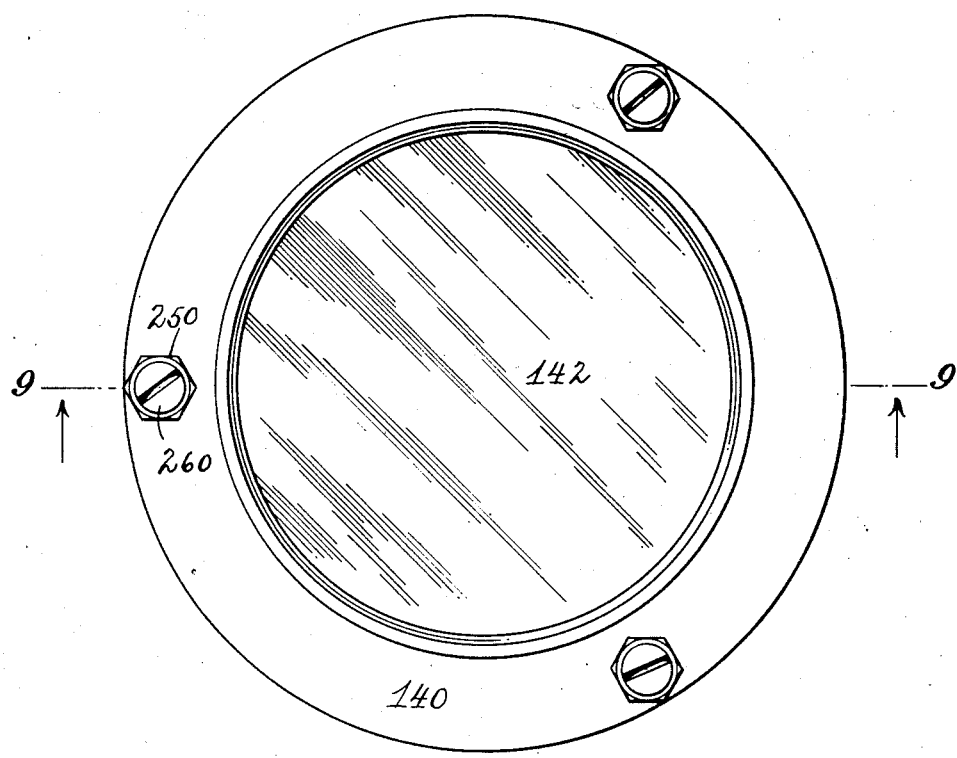

P. FERBER.
MEANS FOR ADJUSTING OPTICAL INSTRUMENTS.
APPLICATION FILED APR. 30, 1913.
1,118,193.
Patented Nov. 24, 1914.
2 SHEETS—SHEET 1.
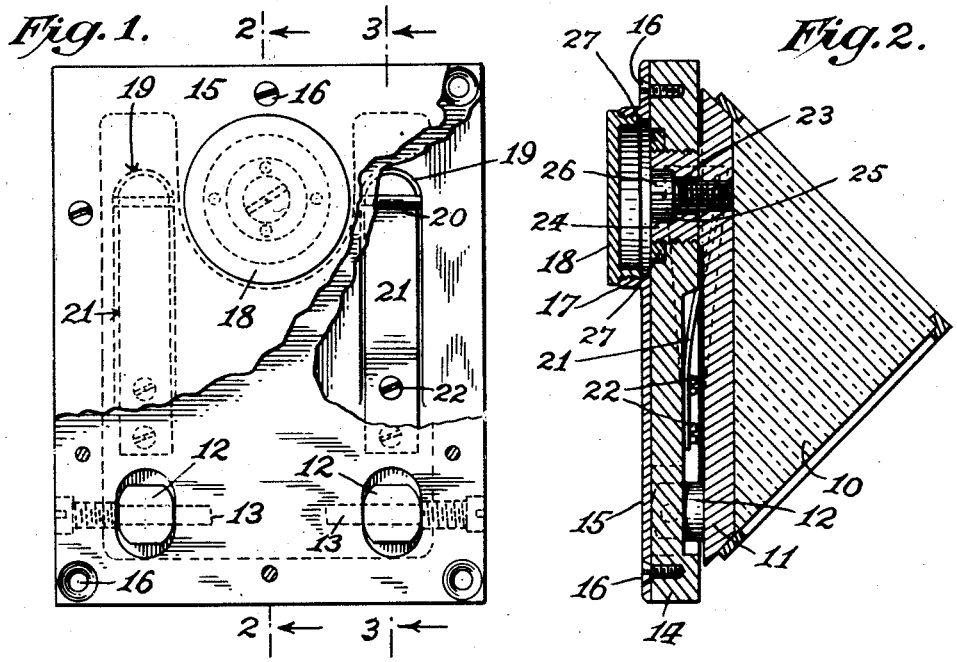
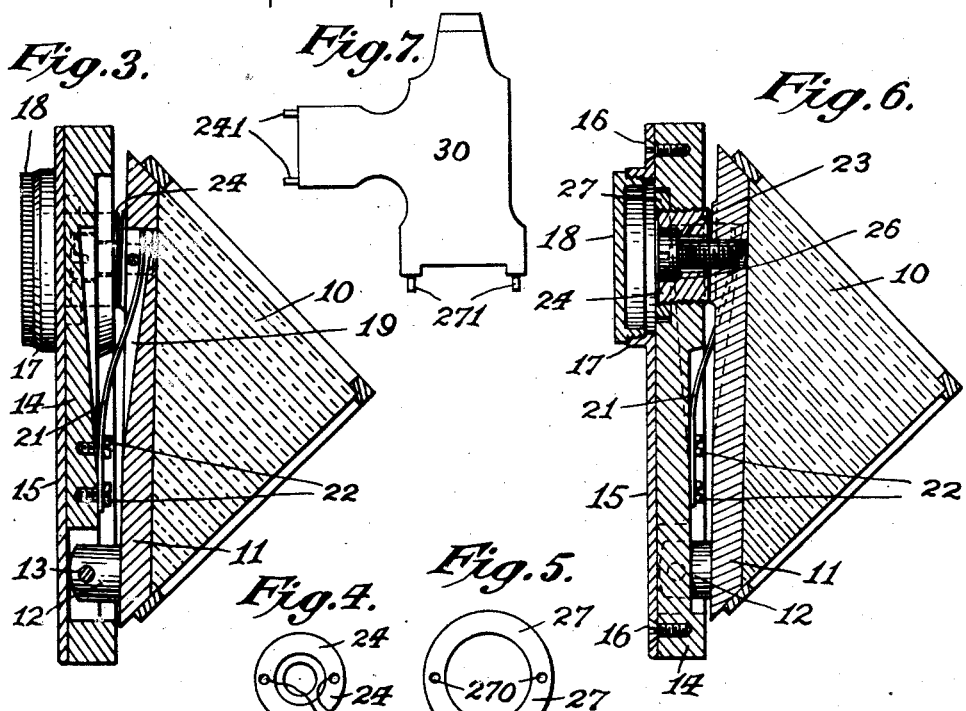
Attest:
Clarence G. Campbell
Mary H. Lewis
Inventor:
Philip Ferber,
by William R. Baird
his Atty P. FERBER.
MEANS FOR ADJUSTING OPTICAL INSTRUMENTS.
APPLICATION FILED APR. 30, 1913.

1,118,193.

Patented Nov. 24, 1914.
2 SHEETS—SHEET 2.

Attest:
Clarence G. Campbell
Mary H. Lewis

Philip Ferber, Inventor:
by William R. Baird
his Atty.

UNITED STATES PATENT OFFICE.

PHILIP FERBER, OF HOBOKEN, NEW JERSEY, ASSIGNOR TO KEUFFEL & ESSER COMPANY, OF HOBOKEN, NEW JERSEY, A CORPORATION OF NEW JERSEY.

MEANS FOR ADJUSTING OPTICAL INSTRUMENTS.

1,118,193.  Specification of Letters Patent.  Patented Nov. 24, 1914.

Application filed April 30, 1913. Serial No. 764,474.

*To all whom it may concern:*

Be it known that I, PHILIP FERBER, a citizen of the United States, residing at Hoboken, in the county of Hudson and State of New Jersey, have invented certain new and useful Improvements in Means for Adjusting Optical Instruments, of which the following is a specification.

This invention relates to means for relatively adjusting optical elements in optical instruments and the like, and its novelty consists in the construction and adaptation of the parts as will be more fully hereinafter pointed out.

It is obvious that in the adjustment of reflecting elements such as mirrors, or prisms, in optical instruments and in the adjustment of erecting elements and lenses forming portions of eye-piece combinations or objective combinations, it is frequently necessary to make a delicate but sure adjustment of the parts with respect to each other and to provide means by which the parts may be rigidly secured in their adjusted positions because the divergence of the rays of light caused by the angular displacement of one optical element with respect to another is multiplied by the distance of the object from the instrument and any error in adjustment becomes serious in proportion as the object to be viewed through it is near or distant from such instrument. The purpose of this invention is to supply a simple and convenient means by which such sure adjustment of optical elements may be secured and maintained.

In the drawings there are illustrated two embodiments of the invention, one relating to the adjustment of a prism in an optical instrument, and the other relating to the adjustment of a lens, or similar element, in an optical instrument, but it will be understood that the principles of the invention are equally applicable to the adjustment of other forms of optical elements or to mechanical elements employed in other relations.

Figure 9:
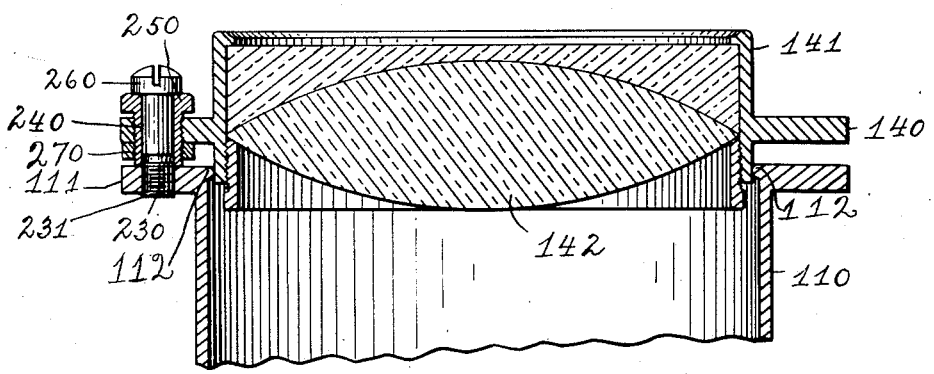

In the drawings, Figure 1 is a bottom plan view of a device embodying the invention as applied to the adjustment of a prism, portions being shown cut away to show concealed parts; Fig. 2 is a transverse section on the plane of the line 2—2 in Fig. 1; Fig. 3 is a transverse section on the plane of the line 3—3 in Fig. 1, the prism being moved from the frame 14; Fig. 4 is a detail of the adjusting ring; Fig. 5 is a detail of the retaining ring; Fig. 6 is a section similar to Fig. 2 but showing the prism moved away from its frame; Fig. 7 is a view of the spanner tool used in actuating the adjusting ring and retaining ring; Fig. 8 is a front elevation of a device embodying the invention as applied to the adjustment of a lens, and Fig. 9 is a central transverse section on the plane of the line 9—9 in Fig. 8, the greater part of the telescope being omitted.

First referring to the device illustrated in Figs. 1 to 6, 10 is a prism of glass or other suitable material, one face of which is secured to a base plate 11 provided on its under surface with a plurality of downwardly projecting lugs 12 suitably apertured to fit over pins 13 which are inserted in recesses formed in the upper portion of a supporting frame indicated at 14 so that the lugs 12 and consequently the base 11 and prism 10 are adapted to swing on such pins as a hinge. The pins 13 are preferably threaded toward their outer ends and are inserted in threaded apertures in the frame 14. A cover plate 15 is secured to the frame 14 by any suitable means as the screws 16, and is provided with an aperture surrounded by a projecting annular flange 17 internally threaded to receive a cover indicated at 18.

The base 11 is provided with two longitudinal recesses indicated at 19, and in line with the lugs 12, and transversely arranged across each recess is a rod 20 and between each rod and the part of the base 11 nearest the prism is a leaf spring 21 secured to the frame 14 by screws 22, or other suitable means, and which springs tend constantly by pressure against the transverse rod 20, to move the base 11 toward the frame 14.

Intermediate the two recesses 19, the base 11 is provided with a threaded aperture adapted to receive a clamping screw 23 which is adapted to loosely fit into an aperture provided in an adjusting screw 24 having an annular shoulder 25 against which the head 26 of the screw 23 is adapted to press. The ring 24 is externally threaded to engage a threaded aperture formed in the frame 14 to receive it, but its inner annular surface is smooth. An annular recess is made in the frame 14 surrounding the ring 24 to provide for the reception of a retaining ring 27 which is internally threaded and adapted to engage the external threads of the adjusting ring 24. The two rings 24 and 27 are provided with recesses indicated at 240 and 270 respectively, and adapted to be engaged by the prongs 241 and 271 of a spanner tool 30, shown in Fig. 7.

The manner of using the device is as follows: Supposing that the parts are in the positions shown in Fig. 2 in which the base 11 is close against the frame 14 and it is desired to tilt the prism 10 on its hinges to move it into the position shown in Figs. 3 and 6. The cap 18 is first removed, then by means of the spanner tool 30 the ring 27 is loosened, then the screw 23 is either removed or simply loosened as may be required, and finally by means of the spanner tool 30 the ring 24 is rotated and moved forward against the base 11 until the prism is in the desired position, the tension of the springs 21, 21 always acting against the forward movement of the ring 24 to keep contact between the ring and the base 11. When the desired position is secured the screw 23 is put into the ring 24 and rotated into the threaded aperture in the base 11 until its head 26 is against the annular shoulder 25 of the ring 24, and the base 11 and the ring 24 are thus firmly connected together. Then as an additional precaution to make a surety of such adjustment, the retaining ring 27 is put into position to hold the ring 24 against all change of displacement. The lid 18 is then put into place. A spanner tool is preferably used to actuate the rings 24 and 27 because such tools are not common and a suitable one would not be apt to be in the possession of an unauthorized operator. New adjustments may be made in substantially the same way.

In Figs. 8 and 9 there is represented a portion of one end of a telescope tube 110 provided with an annular flange 111 having a plurality of threaded apertures adapted to receive screws 230, as hereafter described. In this embodiment of the device there are three such threaded apertures and screws, but any suitable number may be employed and preferably they should be symmetrically arranged with reference to the central longitudinal axis of the instrument.

141 represents a tubular housing of a lens or lens combination indicated at 142 where an objective combination is shown, and which housing is provided with an annular flange 140 preferably corresponding in size to the flange 111 and provided with threaded apertures identical in number and position with the similar apertures in the flange 111. Arranged to engage the threaded apertures in the flange 140 are hollow adjusting screws 240, each having smooth interior surfaces and provided with expanded heads 250 which are adapted to contact with the outer surface of the flange 140. Arranged to pass through the hollow center of each of these adjusting screws are clamping screws 230 having heads 260 and having smooth exterior surfaces where they come into contact with the smooth interior surfaces of the screws 240 and provided with threaded tips 231 by which they are adapted to engage the threaded apertures in the flange 111. Intermediate the flanges 111 and 140 are locking rings 270 threaded internally to engage the exterior threads of the adjusting screws 240 and provided externally with plain angular surfaces or knurled surfaces by means of which they may be rotated either by a suitable tool, or by hand.

The manner of using this form of the invention is as follows: The housing 141 is brought into proximity to the tube 110 so that the flanges 140 and 111 are in approximately parallel planes, the exterior of the housing being adapted to fit within a slightly beaded interior rim 112 with which the tube 110 is provided. A preliminary rough adjustment is made of the housing with respect to the telescope tube 110 by moving the screws 240 forward until they contact with the outer surface of the flange 111 and then connecting such screws to the flange 111 by means of the clamping screws 230. A finer adjustment is then made by trial, the screws 230 being loosened in each instance and the screws 240 being advanced or retarded, as the case may be, to approximate the desired result, and after any one of the screws has been adjusted as desired the locking ring 270 is brought back against the inner surface of the flange 140 and the adjusting screw 240 is thus locked in position.

As three points determine a plane, it is obvious that if two of the adjusting screws are fixed the third, or any other adjusting screw of the series, may be moved forward to contact with the flange 111 and in so doing must move against the retaining force of the other screws of the series already set, so that the tendency to resist such forward movement of the adjusting screws is entirely similar to the tension exerted by the springs 21 in the prism adjustment, above described.

What I claim as new is:

1. In an optical instrument, the combination with associated members relatively adjustable to vary their angular relation, of a device engaging the members for relatively adjusting them, and a connecting device between the adjusting device and one of the members that holds the adjusting device and member against accidental relative movement.

2. In an optical instrument, the combination with a support, of an optical element pivotally mounted on the support, a device engaging the support and element for swinging the latter, and a device connecting the adjusting device and the optical element and holding the optical element against accidental swinging movement with respect to the support.

3. In a device of the character described, an optical element provided with a base, a frame adapted to support it and to which it is hinged, a spring tending to move the base toward the frame, an adjusting device supported by the frame and adapted to be moved toward the base, and means for connecting the adjusting device to the base.

4. In a device of the character described, an optical element provided with a base, a frame adapted to support it and to which it is hinged, a spring tending to move the base toward the frame, an adjusting device supported by the frame and adapted to be moved toward the base, and means for connecting the adjusting device to the base and further means for preventing any accidental displacement of the adjusting device.

5. In a device of the character described, a frame provided with a base, a frame adapted to support it and to which it is hinged, a spring tending to move the base toward the frame, an adjusting device supported by the frame and adapted to be moved toward the base, and means for connecting the adjusting device to the base and further means for preventing any accidental displacement of the adjusting device consisting of a retaining ring mounted on said adjusting device.

6. In a device of the character described, an optical element provided with a base, a frame adapted to support it, hinge members secured to the base and coöperating hinge members secured to the frame, springs tending to hold the base and frame together and means for forcing them apart comprising an adjusting member threaded into the frame and adapted to be moved against the base, and means for coupling the adjusting member and base together.

7. In a device of the character described, an optical element provided with a base, a frame adapted to support it, hinge members secured to the base and coöperating hinge members secured to the frame, springs tending to hold the base and frame together and means for forcing them apart comprising an adjusting member threaded into the frame and adapted to be moved against the base, and means for coupling the adjusting member and base together in combination with means for preventing the displacement of the adjusting member.

8. Means for adjusting two elements with respect to each other comprising an adjusting screw adapted to be threaded through one element, or connected part, to move against the other element or connected part, a device tending to counteract such movement, and means for connecting the screw to the part against which it has moved after such movement.

9. Means for adjusting two elements with respect to each other comprising an adjusting screw adapted to be threaded through one element, or connected part, to move against the other element or connected part, a device tending to counteract such movement, and means for connecting the screw to the part against which it has moved after such movement, and means for locking the adjusting screw in place after such connection has been made.

10. Means for adjusting two elements with respect to each other comprising an adjusting screw adapted to be threaded through one element, to move against the other element, a device tending to counteract such movement, and means for connecting the screw to the element against which it has moved after such movement, and means for locking the adjusting screw in place after such connection has been made, including a locking nut threaded on to the adjusting screw and adapted to engage the adjacent element.

11. In an optical instrument, the combination with relatively adjustable members, of means for adjusting the same, including an element that rotatably bears on one member and a threaded engagement with the other member, and another element having a threaded engagement with the first-mentioned member and rotatably bears in the other element.

12. In an optical instrument, the combination with angularly adjustable members, of means for adjusting the same, including a tubular element having a threaded engagement with one member and rotatably bearing on the other member, and another element having a threaded engagement with the last-mentioned member and being rotatably mounted in the other element.

In testimony whereof I affix my signature in presence of two witnesses.

PHILIP FERBER.

Witnesses:
MARY H. LEWIS,
CLARENCE G. CAMPBELL.